US008806164B2

(12) United States Patent
Albini et al.

(10) Patent No.: US 8,806,164 B2
(45) Date of Patent: Aug. 12, 2014

(54) APPARATUS, ELECTRONIC DEVICES AND METHODS ASSOCIATED WITH AN OPERATIVE TRANSITION FROM A FIRST INTERFACE TO A SECOND INTERFACE

(75) Inventors: Giulio Albini, Giussano (IT); Emanuele Confalonieri, Lesmo (IT)

(73) Assignee: Micron Technology, Inc., Boise, ID (US)

( * ) Notice: Subject to any disclaimer, the term of this patent is extended or adjusted under 35 U.S.C. 154(b) by 433 days.

(21) Appl. No.: 13/041,288

(22) Filed: Mar. 4, 2011

(65) Prior Publication Data

US 2012/0226880 A1   Sep. 6, 2012

(51) Int. Cl.
*G06F 12/00* (2006.01)

(52) U.S. Cl.
USPC ........... 711/163; 711/100; 711/147; 711/150; 711/151; 711/152; 711/154

(58) Field of Classification Search
CPC ..... G06F 12/00; G06F 3/0679; G06F 3/0689; G06F 13/4036
USPC .......... 711/100, 147, 150, 151, 152, 154, 163
See application file for complete search history.

(56) References Cited

U.S. PATENT DOCUMENTS

| 5,913,219 | A | 6/1999 | Baek et al. |
| 7,062,587 | B2 | 6/2006 | Zaidi et al. |
| 7,096,324 | B1 | 8/2006 | May |
| 7,210,012 | B2 | 4/2007 | Lee et al. |
| 7,681,004 | B2 | 3/2010 | Bonella et al. |
| 7,716,608 | B2 * | 5/2010 | Mithal et al. ............. 716/104 |
| 2008/0162823 | A1 | 7/2008 | Day |
| 2008/0215822 | A1 | 9/2008 | Ajanovic et al. |

OTHER PUBLICATIONS

International Search Report and Written Opinion in co-pending Application No. PCT/IT2012/000057, mailed Jun. 22, 2012, in 10 pages.

* cited by examiner

*Primary Examiner* — Midys Rojas (74) *Attorney, Agent, or Firm* — Knobbe, Martens, Olson & Bear, LLP (57) ABSTRACT

Subject matter disclosed herein relates to an apparatus comprising memory and a controller, such as a controller which determines block locking states in association with operative transitions between two or more interfaces that share at least one block of memory. The apparatus may support single channel or multi-channel memory access, write protection state logic, or various interface priority schemes.

31 Claims, 4 Drawing Sheets

APPARATUS, ELECTRONIC DEVICES AND METHODS ASSOCIATED WITH AN OPERATIVE TRANSITION FROM A FIRST INTERFACE TO A SECOND INTERFACE

BACKGROUND

1. Field

Subject matter disclosed herein relates to memory devices and, more particularly, to block locking in memory.

2. Information

In response to a desire for faster, more efficient computer processing systems, attention has been directed to increasing throughput at various levels of a computer system. For example, one level may comprise a memory system, wherein a processor may generate read or write requests at a rate faster than a memory system can handle. Accordingly, techniques for dealing with operating capability imbalances have led to development of multi-channel memory devices. Generally, a dual-channel memory device may incorporate two parallel channels to operate concurrently to reduce latency involving memory read/write operations, for example. In particular, a memory controller may transmit or receive addressed read or write instruction signals to or from multiple memory arrays via two separate, parallel channels. Similarly, two separate, host interfaces may be electronically connected to respective channels of a dual-channel memory device.

BRIEF DESCRIPTION OF THE FIGURES

Non-limiting and non-exhaustive implementations will be described with reference to the following figures, wherein like reference numerals refer to like parts throughout the various figures unless otherwise specified.

DETAILED DESCRIPTION

Reference throughout this specification to "one implementation", "an implementation", or "certain implementations" means that a particular feature, structure, or characteristic described in connection with a described implementation(s) may be included in at least one implementation of claimed subject matter. Thus, appearances of the phrase "in one example implementation", "in an example implementation", or "in certain example implementations" in various places throughout this specification are not necessarily all referring to the same implementation(s). Furthermore, particular features, structures, or characteristics may be combined in one or more implementations.

In an example implementation, a non-volatile memory device may communicate with a plurality of hosts' processors or other like logic via (e.g., through) a plurality of associated interfaces. A non-volatile memory device may, for example, comprise either a single channel memory device or a multi-channel memory device. Two or more of a plurality of interfaces may be of a same type or of differing types. By way of non-limiting example, in certain implementations, one interface may comprise a parallel interface while another interface may comprise a serial interface. A non-volatile memory device may, for example, comprise a phase change memory (PCM), a flash memory, or the like or any combination thereof, though claimed subject matter is not limited to such examples.

As described in greater detail herein, in certain example implementations, an apparatus may be provided which may comprise memory and a controller, such as control logic and/or control firmware. An apparatus may, for example, be used with an electronic device, such as, e.g., a computing device or system, a communication device, or any like electronic device or devices that may access a memory via two or more interfaces. For example, a controller may be provided to manage or otherwise determine a block locking state (hereinafter, referred to as a "locking state") of at least one block of memory associated with (e.g., with regard to) at least one interface based, at least in part, on a locking state of the at least one block of memory associated with at least one other interface. For example, a controller may determine a locking state associated with (e.g., in support of) an operative transition from one interface to another interface. In certain example implementations, a controller may determine a locking state based, at least in part, on a priority scheme associated with one or more interfaces. In certain example implementations, a controller may determine a locking state based, at least in part, on a write protect logic state that may be operatively associated with at least one interface, for example. By way of non-limiting examples, a write protect logic input signal may be set via programmable logic, one or more processors, a hardware switch, etc.

In certain example implementations, an apparatus may comprise a register (e.g., a "locking" register) that may be selectively programmed by a controller to indicate a locking state of a block of memory, or locking states of a plurality of blocks of memory. Thus, for example, a controller may obtain (e.g., store) electrical signals indicative of one or more locking states using the locking register. In some non-limiting examples, a controller may affect electrical signals within the locking register as applicable to indicate a locking state, which may or may not change as part of an operative transition from one interface to another interface.

Figure 1:
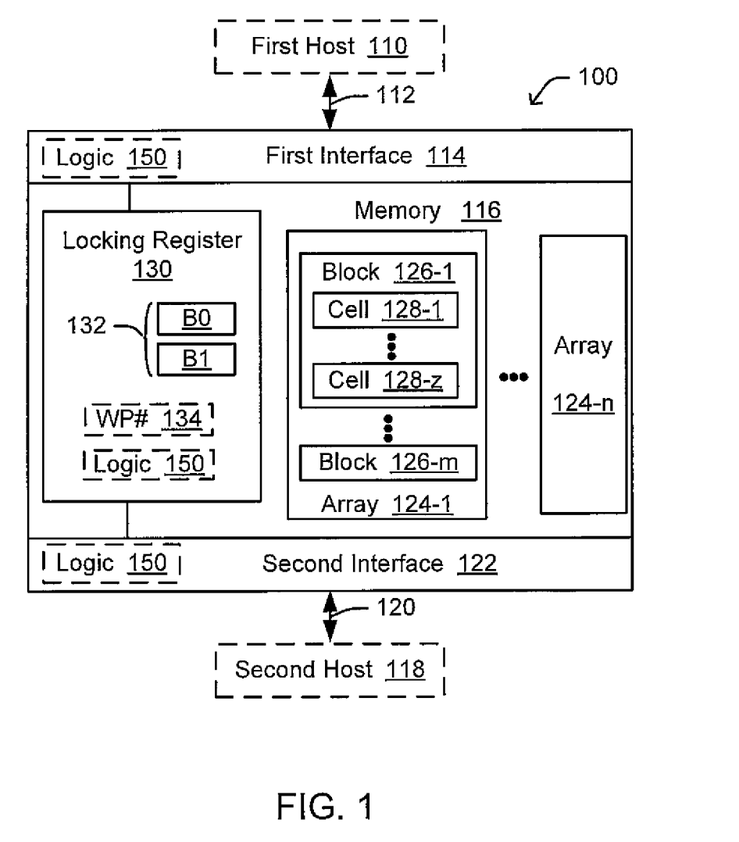
FIG. 1 is a schematic diagram showing an apparatus comprising a memory device, according to an implementation.

With these examples in mind, reference is now made to FIG. 1, which is a schematic diagram showing a memory device 100, according to an example implementation.

Memory device 100 may, for example, be provided for use in an electronic device utilizing one or more electrical signals representing information in the form of binary digital signals to be stored in memory 116 or retrieved from memory 116. Thus, for example, memory device 100 may be used in a computer or other like computing platform, a communication device, a machine, etc., in which memory device 100 may be accessed by one or more host processors. For example, a first host 110 may access memory device 100 via a first interface 114 and a second host 118 may access memory device 100 via a second interface 122. At certain times, first interface 114 or second interface 122 may be operatively active with regard to one or more blocks or channels of a memory 116. A switch from one interface to another interface may occur, for example, responsive to (e.g., during or in response to) an operative transition process. An interface (e.g., hardware or firmware based computing or communication circuitry) that is operatively active may, for example, access (e.g., via read or write operations) applicable cells within one or more blocks or channels of memory 116. An interface that is not operatively active may not access applicable memory cells within one or more blocks or channels of memory 116, for example.

Figure 2:
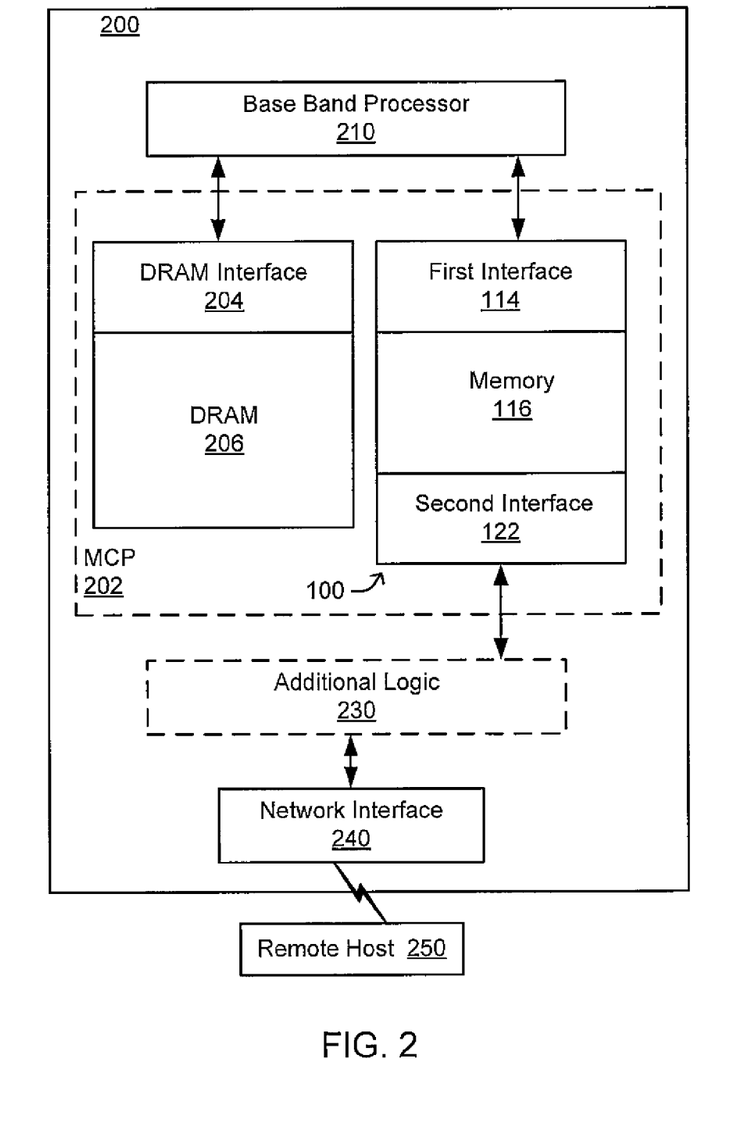
FIG. 2 is a schematic diagram showing a memory device, e.g., as in FIG. 1, within an electronic device, according to an implementation.

In a particular implementation, as shown in FIG. 2, for example, a first host may comprise a baseband processor 210 or the like of a mobile communication device 200, whereas a second host may comprise an external remote processor 250 connected with mobile communication device 200 through a network interface 240 and possibly other logic 230. Logic 230 may, for example, provide additional signal buffering or processing to support access to a memory device 100. In this example implementation, baseband processor 210 may access memory device 100 via first interface 114, and external host processor 250 may access memory device 100 via second interface 122. Of course this is merely an example.

As illustrated in FIG. 2, network interface 240 may, for example, provide a radio frequency (RF) interface to allow external host processor 250 to communicate with memory device over a wireless interface. In other example implementations, network interface 240 may provide for a non-wireless interface (e.g., via one or more wires, cables, fibers, networks, etc.). In certain example implementations, memory device 100 may be provided on a multiple chip package (MCP) 202, or the like, e.g., along with other memory such as dynamic random access memory (DRAM) 206 which, in this example, may be accessed by base band processor 210 via DRAM interface 204. Again, there are simply illustrated examples.

Returning to FIG. 1, first host 110 may represent one or more processors or other like computing logic that may access memory 116 via first interface 114. Second host 118 may represent one or more processors or other like computing logic (e.g., hardware or firmware based computing circuitry) that may access memory 116 via second interface 122.

As previously mentioned, in certain example implementations, some interfaces may be different from other interfaces in some operative or other design respect. With regard to FIG. 1, it is assumed that first interface 114 and second interface 122 are indeed different in some respect. By way of a non-limiting example, it is assumed that based, at least in part, on some difference between first interface 114 and second interface 122 there is also at least one difference with regard to at least one identifiable locking state associated with at least one block of memory 116. For example, first interface 114 may be associated with (e.g., support or recognize) one or more particular locking states that second interface 122 is not associated with (e.g., does not support or recognize), or vice versa. In another example, first interface 114 may determine one or more particular locking states in a manner that is different from second interface 122, or visa versa. In yet another example, first interface 114 may identify one or more particular locking states in a manner that is different from second interface 122, or visa versa. In FIG. 1, for example, a plurality of blocks of memory are shown and identified as 126-1 through 126-m. For the sake of brevity, in this description, the terms "block 126" or "blocks 126" may be used as a generic reference to one or more of the plurality of blocks 126-1 through 126-m.

Accordingly, memory device 100 may, for example, comprise a controller 150 to operatively manage certain differences between first interface 114 and second interface 122 with regard to a locking state of at least one block 126 of memory 116. In a particular example implementation, controller 150 may be provided to determine a locking state associated with (e.g., in support of) an operative transition between first interface 114 and second interface 122, or vice versa.

As illustrated in FIG. 1, controller 150 may be provided in whole or part in a locking register 130 (shown in memory 116, for example). In certain example implementations, controller 150 may be provided in whole or part in first interface 114 or second interface 122. In certain other example implementations, controller 150 may provided in whole or part in a one or more other circuits, devices, etc. Indeed, in certain example implementations, controller 150 may be implemented via one or more special purpose processing units programmed via computer implementable instructions which may be or may be capable of being stored on a non-transitory computer readable medium (not shown), for example.

Controller 150 may, for example, implement or otherwise support techniques to manage block locking within memory 116 during an interface switch (e.g., as part of an operative transition in access control), for example, from first interface 114 to second interface 122, or visa versa. In certain example implementations, a locking register 130 may be provided to preserve block locking information applicable to interface switching. Locking register 130 may be accessed via an active interface, for example.

Figure 3:
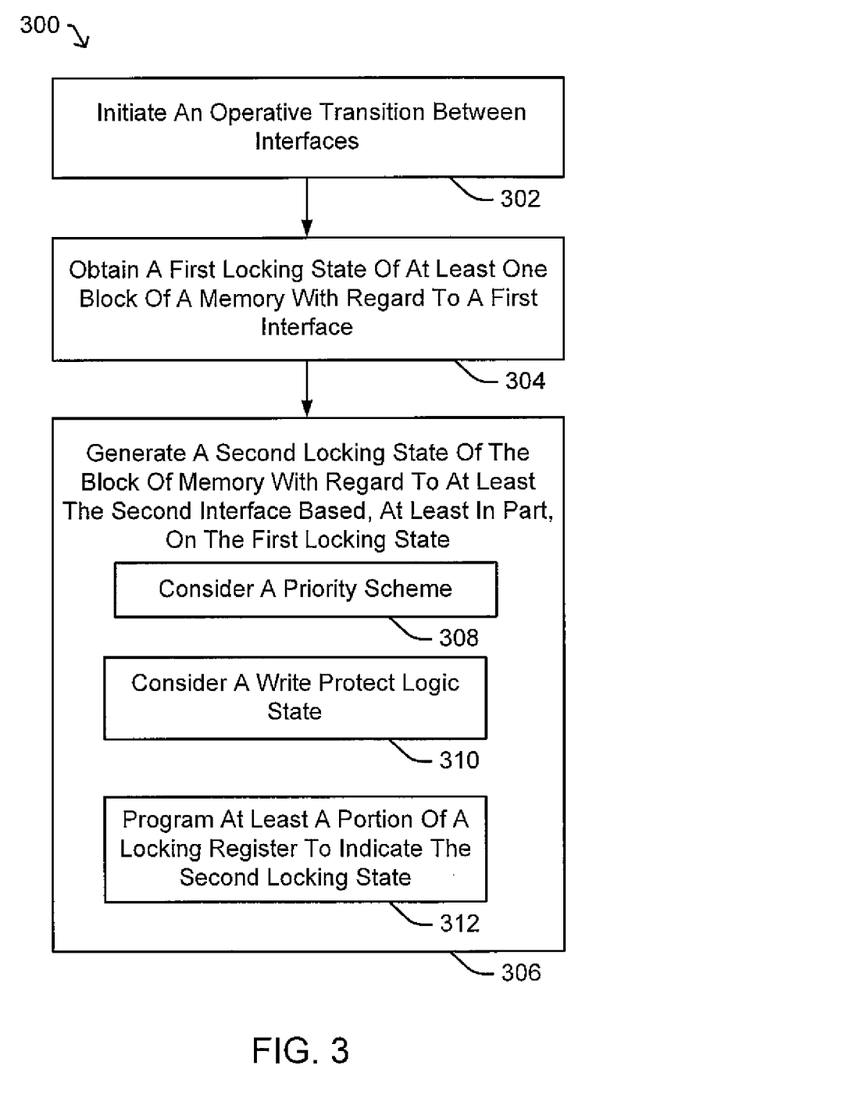
FIG. 3 is a flow diagram of a method for operating a memory device, e.g., as in FIG. 1, according to an implementation.

Attention is drawn next to FIG. 3, which comprises a flow diagram illustrating an example process 300 that may be implemented, at least in part, in and/or with controller 150, such as in memory device 100 of FIG. 1 and FIG. 2.

At block 302, an operative transition may be initiated to switch between first and second interfaces. For example, an operative transition may be initiated internally by controller 150, interface 114, or interface 122, or externally by one or more processors, or other like computing logic, or any combination thereof.

At block 304, a first locking state of at least one block of a memory associated with a first interface (e.g., an initially active interface, such as first interface 114) may be obtained. For example, a first locking state represented by one or more electrical signals may be obtained from locking register 130 (FIG. 1).

At block 306, a second locking state of the block of memory associated with at least a second interface (e.g., the next active interface, such as second interface 122) may be determined (e.g., generated or otherwise established) based, at least in part, on the first locking state. For example, one or more electrical signals may be generated which represent a second locking state of the block of memory, and used to program an applicable portion of locking register 130, e.g., at block 312. In certain example implementations, at block 308, the second locking state may be based further, at least in part, on a priority scheme associated with the first and second interfaces. In still other example implementations, at block 310, the second locking state may be based further, at least in part, on a write protect logic state associated with the first interface or the second interface.

Returning back to FIG. 1, as shown, memory 116 may comprise a plurality of memory arrays 124-1 through 124-n. As illustrated in example memory array 124-1, a memory array may comprise a plurality of blocks 126-1 through 126-m. As illustrated in example block 126-1, a memory block may comprise a plurality of memory cells 128-1 through 128-z. For the sake of brevity, in this description, the terms "memory cell 128" or "memory cells 128" may be used as a generic reference to one or more of the plurality of memory cells 128-1 through 128-z. A memory cell 128 may, for example, be placed in a data state representing a logic bit (e.g., a "1" or a "0").

In this particular example, it is assumed that all of the blocks of memory are accessible by the first and second interfaces, and as such, at times, the first and second interfaces may selectively set a locking state for individual blocks of memory 116. However, claimed subject matter is not necessarily limited in this respect.

By way of example, one locking state may indicate (e.g., identify or specify) that a block 126 of memory 116 is "locked", which may indicate (e.g., to an interface or host) that memory cells 128 in the block may not be programmed or erased, but may be read. As another example, a locking state may indicate that a block 126 of memory 116 is "unlocked", which may indicate that memory cells 128 in the block may be programmed, erased, or read. As still another example, a locking state may indicate that a block 126 of memory 116 is "locked down," which may indicate that memory cells 128 in the block may not be programmed or erased, but may be read, and further that a write protect state (WP#134) may be set appropriately to allow the locking state of a "locked down" block to be set to an "unlocked" state.

These are but a few example locking states, and, as such, it should be understood that claimed subject matter is not necessarily limited in this respect. For example, in certain implementations, another example locking state may indicate an additional "read protection," which may further indicate whether memory cells 128 within a block 126 of memory 116 may be read.

As mentioned, first interface 114 and second interface 122 are assumed to be of differing types. More specifically, in this example it is assumed that first interface 114 is associated with (e.g., supports) unlocked, locked, and locked down states and that the unlocked state may be based further, at least in part, on write protect logic state WP#134, while second interface 122 is associated with unlocked, locked and locked down states, but without consideration of WP#134. Thus, in an example implementation, a locking state for a block 126 of memory 116 may be determined (e.g., managed) using controller 150 via locking register 130. For example, locking register 130 may comprise a plurality of bits 132 for a block of memory. Locking register 130 may be commonly accessed via both interfaces.

Thus, as illustrated in FIG. 1, locking register 130 may provide, for a block 126 of memory 116, a bit "B0" to indicate either a "locked" or "unlocked" state (e.g., B0 equal to logic "1" may represent a locked state, and B0 equal to logic "0" may represent an unlocked state), and a "B1" bit to indicate a "locked down" state (e.g., B1 equal to logic "1" represents a locked down, and B1 equal to logic "0" represents a not locked down or don't care). As illustrated in certain examples below, a B1 bit may serve as a "locked down" enabler in instances in which an interface may be associated with (e.g., use) a write protect (WP#134) logic state (e.g., via a pin or signal). A block may, for example, be indicated as being locked down if B1 is equal to logic "1" and WP#134 represents a logic "0". Notice that in the present example, first interface 114 does use (consider) WP#134.

With these examples in mind, if transitioning operative control of at least a portion of memory 116 between interfaces, it may be desirable to preserve a locking state of an applicable block 126 of memory 116 as part of an interface transition. To do this, locking register 130 may be provided in common between first and second interfaces and memory device 100 may assign a different priority to locking bits 132 therein. For example, bit B0 may be assigned a higher priority than bit B1. Thus, for example, if a bit B0 is equal to a logic "1" then a locking state for an applicable block of memory may comprise locked or locked down; conversely, if bit B0 is equal to a logic "0," then a locking state for an applicable block of memory may comprise unlocked. Since, in this example, bit B1 has a lower priority than bit B0, a locking state for an applicable block of memory may be conditional on bit B0 being equal to a logic "1", and bit B1 may be changed (e.g., from a logic "0" to a logic "1") to indicate a locked down state. For example, should a write protect state (e.g., WP#134) be in use by a particular interface, bit B1 being equal to logic "1" may set an enablement of a locked down state such that if WP# represents logic "0" an applicable block is placed in a locked down state.

Thus, by way of example, possible locking states associated with (e.g., for) an example first interface 114 and second interface 122 may comprise:

First interface (I/F#1) (WP#, B1, B0)
(1,0,0)=Unlocked
(1,0,1)=Locked
(1,1,0)=Unlocked (Locked down enabled, but WP#=1)
(1,1,1)=Locked (Locked down enabled, but WP#=1)
(0,0,0)=Unlocked
(0,0,1)=Locked
(0,1,1)=Locked Down
Second interface (I/F2) (B1, B0)
(0,0)=Unlocked
(0,1)=Locked
(1,0)=Unlocked
(1,1)=Locked Down For example, to preserve locking states during an interface transition from first interface 114 (e.g., I/F#1) to second interface 122 (e.g., I/F#2) in this example, controller 150 may implement or otherwise support the following example conversion technique at block 306 in process 300 of FIG. 3:

| First interface (I/F#1) (WP#, B1, B0) | | Second interface (I/F#2) (B1, B0) |
|---|---|---|
| (1, 0, 0) = Unlocked | ---> | (0, 0) = Unlocked |
| (1, 0, 1) = Locked | ---> | (0, 1) = Locked |
| (1, 1, 0) = Unlocked | ---> | (1, 0) = Unlocked |
| (1, 1, 1) = Locked | ---> | (1, 1) = Locked Down |
| (0, 0, 0) = Unlocked | ---> | (0, 0) = Unlocked |
| (0, 0, 1) = Locked | ---> | (0, 1) = Locked |
| (0, 1, 1) = Locked Down | ---> | (1, 1) = Locked Down |

Conversely, for example, to preserve locking states during an interface transition from second interface 122 to first interface 114, controller 150 may implement or otherwise support the following example conversion technique at block 306 in process 300 of FIG. 3:

| Second interface (I/F2) (B1, B0) | | First interface (I/F1) (WP#, B1, B0) |
|---|---|---|
| (0, 0) = Unlocked | ---> | (1, 0, 0) = Unlocked |
| (0, 1) = Locked | ---> | (1, 0, 1) = Locked |
| (1, 0) = Unlocked | ---> | (1, 1, 0) = Unlocked |
| (1, 1) = Locked Down | ---> | (1, 1, 1) = Locked |
| (0, 0) = Unlocked | ---> | (0, 0, 0) = Unlocked |
| (0, 1) = Locked | ---> | (0, 0, 1) = Locked |
| (1, 1) = Locked Down | ---> | (0, 1, 1) = Locked Down |

Note, that in this example, a locking state corresponding to (0,1,0) may be forbidden (not used); and, that in case of a WP# logic transition on a (1,1,0) locking state, a resulting locking state may comprise (0,1,1). Also, in this example, two locking states (1,1,1) and (1,1), after interface transition, change from a locked state to locked down state, and from a locked down state to a locked state, respectively. This is a minor exception in an example preservation process, but one which may be tolerated in most instances since, in a resulting locking state, an applicable block may remain at least write protected.

In another example implementation, in addition to preserving locking states of blocks 126 of memory 116 as part of an operative transition of interfaces, controller 150 may also be associated with (e.g., implement or otherwise support) an interface priority scheme. For example, it is possible to give a higher priority to one of the interfaces to forbid an interface from changing a locking state that is set to a locked state or a locked down state.

Figure 4:
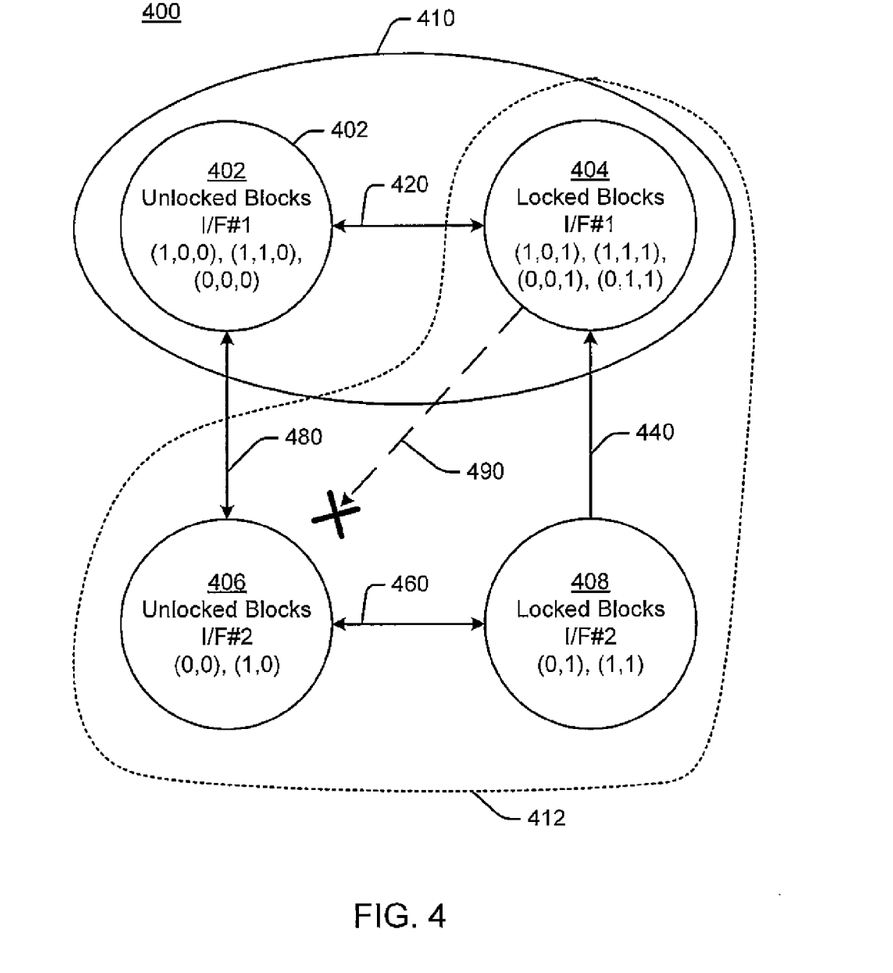
FIG. 4 is a state diagram illustrating certain locking state transitions relating to a controller in a memory device, e.g., as in FIG. 1, according to an implementation.

For example, if first interface 114 has a higher priority than second interface 122, controller 150 may implement or otherwise support an example technique, as illustrated in state diagram 400 of FIG. 4 (e.g., as part of blocks 306, 308 or 310 in process 300 of FIG. 3), in which the following states may be specified:

First interface (I/F#1) (WP#B1, B0)
(1,0,0)=Unlocked
(1,0,1)=Locked
(1,1,0)=Unlocked (Locked down enabled, but WP#=1)
(1,1,1)=Locked (Locked down enabled, but WP#=1)
(0,0,0)=Unlocked
(0,0,1)=Locked
(0,1,1)=Locked Down
Second interface (I/F#2) (B1, B0)
(0,0)=Unlocked
(0,1)=Locked
(1,0)=Unlocked
(1,1)=Locked Down Diagram 400 shows four representative states, a state being represented by a circle. In this example, according to the above specified locking states, at circle 402 one or more blocks 126 of memory 116 are in an unlocked state associated with first interface 114 (I/F#1). At circle 404, one or more blocks 126 of memory 116 are in a locked state or a locked down state associated with I/F#1. At circle 406, one or more blocks 126 of memory 116 are in an unlocked state associated with second interface 122 (I/F#2). At circle 408, one or more blocks 126 of memory 116 are in a locked state or a locked down state associated with I/F#2.

Also illustrated in diagram 400, is a priority scheme in which operative transitions associated with region 410 relate to IF#1 having a higher priority and being active and operative transitions associated with region 412 relate to IF#2 having a lower priority and being active. Lines with arrows (one-way or two-way) between various circles represent an example conversion technique that may be implemented (e.g., by logic 150) based, at least in part, on an initial locking state, the example priority scheme, and write protect logic state.

Thus, as illustrated in region 410, line 420 shows that a locking state of block 126 of memory 116 set by IF#1 to a locked state or a locked down state may be changed there between, or to an unlocked state by IF#1 while it is active. Likewise, in the portion of region 412 that does not overlap region 410, line 460 shows that a locking state of block 126 of memory 116 set by IF#2 to a locked or a locked down state may be changed there between, or to an unlocked state by IF#2 while it is active.

Further, as part of an operative transition between IF#1 and IF#2, line 480 shows that blocks 126 of memory 116 having an unlocked state in circle 402 remain in an unlocked state in circle 406, and vice versa.

As part of an operative transition from IF#2 to IF#1, line 440 shows that blocks 126 of memory 116 having a locked state or a locked down state associated with (e.g., as set by) IF#2 in circle 408 remain in a locked state or a locked down state in circle 404. However, as part of an operative transition from IF#1 to IF#2, and with IF#1 having a higher priority in accordance with a priority scheme, dashed line 490 shows that blocks 126 of memory 116 having a locked state or a locked down state associated with IF#1 in circle 404 may not be subsequently unlocked by IF#2 in circle 406 (e.g., via circle 408). Furthermore, as a result of a priority scheme and considering an applicable write protect logic state, a block 126 of memory 116 that is set to a locked down state by IF#1 may not be subsequently changed to a locked state by IF#2 in circle 408.

Although the terms "first interface" and "second interface" are used in the examples described above and illustrated in certain drawings, use of such terms in claimed subject matter is not necessarily intended to limit subject matter to the illustrated examples. Instead the terms "first interface" and "second interface" as recited in claimed subject matter is simply intended to differentiate two interfaces. Moreover, the terms "first interface" and "second interface" as recited in claimed subject matter is not intended to necessarily indicate any particular transition sequence or any other like temporal limitation with respect to the two differentiated interfaces.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

Methodologies described herein may be implemented by various means depending, at least in part, on applications according to particular features or examples. For example, such methodologies may be implemented in hardware, firmware, or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods or apparatuses that would be known by one of ordinary skill have not been described in detail so as not to obscure claimed subject matter.

Some portions of the preceding detailed description have been presented in terms of logic, algorithms or symbolic representations of operations on binary states stored within a memory of a specific apparatus or special purpose computing device or platfoun. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", "generating", or the like may refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. In still other memory devices, a change in physical state may involve quantum mechanical phenomena, such as, superposition, entanglement, or the like, which may involve quantum bits (qubits), for example. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A computer-readable (storage) medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. An apparatus comprising:
   memory; and
   a controller configured to determine a locking state of a block of said memory associated with a first interface based, at least in part, on a locking state of said block of said memory associated with a second interface,
   wherein a number of locking states of said first interface is different from a number of locking states of said second interface,
   wherein said locking states of said first interface comprise a locked state, an unlocked state, and a locked down state, wherein said unlocked state of said first interface is based, at least in part, on a write protect logic state, and
   wherein said locking states of said second interface comprise a locked state, an unlocked state, and a locked down state, wherein said unlocked state of said second interface is not based, at least in part, on said write protect logic state.

2. The apparatus as recited in claim 1, wherein said locking state associated with said first interface is different from said locking state associated with said second interface.

3. The apparatus as recited in claim 1, wherein said locking state associated with said first interface is not associated with said second interface.

4. The apparatus as recited in claim 1, wherein said locking state associated with said second interface is not associated with said first interface.

5. The apparatus as recited in claim 1, wherein said controller is further configured to:
   determine said locking state associated with said first interface responsive to an operative transition from said second interface to said first interface.

6. The apparatus as recited in claim 1, wherein said controller is further configured to:
   determine said locking state based, at least in part, on a priority scheme associated with at least one of the interfaces.

7. The apparatus as recited in claim 1, wherein said controller is further configured to:
   determine said locking state based, at least in part, on said write protect logic state.

8. The apparatus as recited in claim 1, further comprising:
   a register,
   wherein said controller is further configured to:
       selectively program at least a portion of said register to indicate said locking state associated with said first interface.

9. The apparatus as recited in claim 8, wherein at least a portion of said controller is provided within said register.

10. The apparatus as recited in claim 8, wherein said register preserves block locking information applicable to interface switching.

11. The apparatus as recited in claim 8, wherein said register is accessible via said interfaces.

12. The apparatus as recited in claim 1, wherein said controller is further configured to:
    obtain first signals indicative of said locking state associated with said second interface; and convert said first signals to second signals, said second signals being indicative of said locking state associated with said first interface.

13. The apparatus as recited in claim 1, wherein said memory comprises a multiple-channel memory.

14. The apparatus as recited in claim 1, wherein said block of memory comprises a phase change memory (PCM) cell.

15. The apparatus as recited in claim 1, further comprising:
said first interface; and
said second interface,
wherein at least a portion of said controller is provided within at least one of said interfaces.

16. The apparatus as recited in claim 1, wherein at least one of said interfaces is configured to provide a host access to said block of said memory.

17. The apparatus as recited in claim 16, wherein said first interface comprises a non-wireless interface to a first host disposed in a mobile device, and said second interface comprises a wireless interface to a second host.

18. The apparatus as recited in claim 1, wherein said locking state associated with said first interface has a different associated locking bit from said locking state of said second interface.

19. The apparatus as recited in claim 18, wherein said locking bit is associated with said write protect logic state.

20. The apparatus as recited in claim 1, wherein said first interface and said second interface are configured to read said block of said memory in said locked state or said locked down state, and wherein said first interface and said second interface are configured to not program or erase said block of said memory in said locked state or said locked down state.

21. A method associated with an operative transition from a first interface to a second interface, the method comprising:
obtaining a signal representative of a first locking state of a block of a memory, said first locking state being associated with said first interface; and
generating a signal representative of a second locking state of said block of said memory based, at least in part, on said first locking state, wherein said second locking state is associated with said second interface,
wherein a number of locking states of said first interface is different from a number of locking states of said second interface,
wherein said locking states of said first interface comprise a locked state, an unlocked state, and a locked down state, wherein said unlocked state of said first interface is based, at least in part, on a write protect logic state, and
wherein said locking states of said second interface comprise a locked state, an unlocked state, and a locked down state, wherein said unlocked state of said second interface is not based, at least in part, on said write protect logic state.

22. The method as recited in claim 21, further comprising:
generating said signal representative of said second locking state based further, at least in part, on a priority scheme associated with the interfaces.

23. The method as recited in claim 21, wherein said first locking state is different from said second locking state.

24. The method as recited in claim 21, wherein said second locking state has a different associated locking bit from said first locking state.

25. The method as recited in claim 24, wherein said locking bit is associated with said write protect logic state.

26. The method as recited in claim 21, wherein said first interface and said second interface are configured to read said block of said memory in said locked state or said locked down state, and wherein said first interface and said second interface are configured to not program or erase said block of said memory in said locked state or said locked down state.

27. An electronic device comprising:
memory;
a plurality of interfaces configured to provide selective access to a block of said memory based, at least in part, on a locking state associated with said block of said memory, said plurality of interfaces comprising a first interface and a second interface, wherein said first interface is further responsive to a write protect logic state associated with said block of memory and said second interface is not further responsive to said write protect logic state; and
a controller configured to:
change, responsive to an operative transition from said first interface to said second interface, said locking state from a locked state to a locked down state; and
selectively change, responsive to an operative transition from said second interface to said first interface, said locking state from said locked down state to said locked state based, at least in part, on said write protect logic state,
wherein locking states of said first interface comprise said locked state, an unlocked state, and a locked down state, wherein said unlocked state of the first interface is based, at least in part, on said write protect logic state, and
wherein locking states of said second interface comprise a locked state, an unlocked state, and said locked down state, wherein said unlocked state of said second interface is not based, at least in part, on said write protect logic state.

28. The electronic device as recited in claim 27, further comprising:
a register,
wherein said controller is further configured to selectively program at least a portion of said register to indicate said locking state.

29. The electronic device as recited in claim 27, further comprising:
a host,
wherein said first interface is configured to electronically connect said block of said memory to said host.

30. The electronic device as recited in claim 27, further comprising:
a network interface,
wherein said second interface is configured to electronically connect said block of said memory to a host via said network interface.

31. The electronic device as recited in claim 27, wherein said first interface and said second interface are configured to read said block of said memory in said locked state or said locked down state, and wherein said first interface and said second interface are configured to not program or erase said block of said memory in said locked state or said locked down state.

* * * * *